Aug. 20, 1974    G. DIMITRIADIS ET AL    3,830,944

SANDWICH PACKAGE

Filed April 13, 1972

United States Patent Office 3,830,944
Patented Aug. 20, 1974

3,830,944
SANDWICH PACKAGE
George Dimitriadis, 2209 S. Hickory, Santa Ana 92707, and Gloria Belle Dimitriadis Alwood, 7597 El Terraza Drive, Sacramento, Calif. 95828
Filed Apr. 13, 1972, Ser. No. 243,770
Int. Cl. B65b 25/22
U.S. Cl. 426—113
7 Claims

ABSTRACT OF THE DISCLOSURE

A package of a pre-cooked and frozen sandwich is described which is formed with an outer foil envelope of a high melting point plastic suitable for immersion in boiling water surrounding sandwich ingredients. The sandwich is encased in the package with the meat portion bearing against at least one side of the surrounding envelope and the bread portions of the sandwich disposed in successive layers thereon. The package automatically rights its position when placed in water to immerse the meat side into the water for thorough heating of the meat while the bread portions are heated by internal steam generated from the meat and sauce components. A preferred embodiment comprises a hamburger where the meat patty bears against the inside surface of the plastic envelope and the package contains, in successive layers, a meat sauce, a bread-sealing cheese sauce, one of the halves of a hamburger bun and the remaining half of the bun.

DESCRIPTION OF THE INVENTION

The invention relates to a food package and, in particular, relates to a package of a pre-cooked and frozen sandwich which can be readily unthawed and heated to serving temperature by placing it in hot water.

The processing and distribution of frozen foods has become a major industry and high proportion of the food market is supplied with frozen foods. Some pre-cooked foods have been marketed as frozen items requiring only that the consumer thaw and heat the package. Recent innovations in this field have been the use of plastic foil containers which can be placed directly into boiling water to effect a rapid heating of the food.

Despite the vast size of the frozen food industry, there has as yet been no successful marketing of frozen sandwiches, particularly of hamburgers. It is believed that the major differences in the bread and meat portions of sandwiches has hampered development of a satisfactory package. Some of the difficulties encountered in reheating sandwiches is that the meat portion can not be adequately heated without burning or dehydrating the bread layers or without having the meat sauce soak into the bread layers.

We have now found that pre-cooked sandwiches, particularly hamburgers, can be disposed in plastic foil containers in such a manner that they can be quickly heated in hot water to a delicious product that compares to freshly prepared sandwiches. The arrangement of the sandwich ingredients in the package as well as the consistency of the paste and sauce condiments insures that the meat component is thoroughly heated while the bread portion is warmed and freshened by internal steaming without becoming sodden from the sauce condiments.

The package that we have found achieves these purposes comprises an envelope of a plastic foil with sandwich ingredients sealed therein. The meat portion of the sandwich is disposed with one side in direct contact with an inside surface of the package. A meat sauce having a semisolid consistency is on the opposite side of the meat portion. One of the bread layers of the sandwich, e.g., half of a bun lies on the meat sauce layer, preferably with a bread sealing layer of cheese between the meat sauce and the bread. The remaining bread layer lies on the first mentioned layer and its opposite side is in contact with the opposite inside surface of the plastic foil envelope. The packaging can be applied to any type of sandwich; it is preferred for hamburgers. In general, the sandwich is opened and placed in the envelope as an open faced sandwich with the meat portion bearing against an inside surface of the foil envelope and with the remaining bread layer placed between the bread layer of the open faced sandwich and the opposite inside surface of the foil envelope.

The invention will now be described with reference to the figures, of which:

Figure 1:
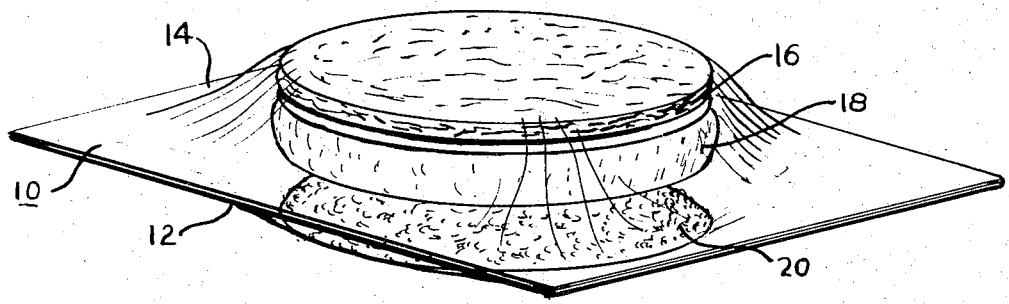
FIG. 1 shows a typical package of the invention.

Referring now to FIG. 1, the packaged, pre-cooked sandwich is shown. The sandwich illustrated is a hamburger that is contained in a plastic foil envelope 10 which is formed of sides 12 and 14 that are joined and sealed at their peripheral edges. Printed indicia of the usual type, including directions, package dating and trade marking can be placed on the plastic foil or the entire package can be placed in another box or container bearing the indicia.

The meat portion 16 of the sandwich is placed within the envelope with one side thereof bearing against an inside flat surface of foil layer 14. The meat portion should be disposed in the package so that substantially entirely one side of the meat portion is exposed to contact with the foil layer. Disposed in successive layers are the two bread slices of the sandwich, typically the split halves 18 and 20 of a bun.

Various plastics can be used for the foil envelope. The plastic should, of course, have a softening or melting point above about 225° F. Preferably the plastic should retain a high strength at a temperature above about 260° F. to permit its use in warming the food in the manner described herein. Polyolefins, e.g., polyethylene, polypropylene, etc., can be used, as well as copolymers thereof with comonomers such as vinyl acetate, vinyl chloride, vinylidene chloride, etc. Other polymers that can be used include: water insoluble hydroxyethyl cellulose, crosslinked styrene-divinyl benzene copolymers, polyisobutylene and copolymers thereof with isoprene. A preferred material comprises a polypropylene-polyethylene laminate which has a thickness of about 2–3 mils. The polypropylene film is used to impart the desired hot strength while the polyethylene is laminated thereto to permit heat sealing of the peripheral margins. Such a laminate is available under the designation Scotch Pak 5 from the Minnesota Mining and Manufacturing Company.

Figure 2:
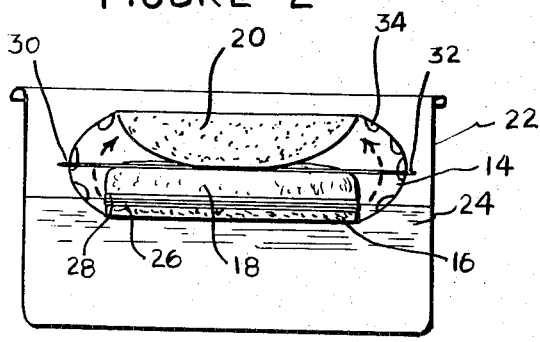
FIG. 2 shows the position of the package when heating its contents.

FIG. 2 illustrates the package as it is being warmed, prior to serving. The package can be removed from a storage freezer and dropped directly into a pan 22 of boiling water 24. Because the greatest weight of the package is on the meat side, the package will always right itself with side 14 immersed in the water. This will place side 14 in contact with the hot water for maximum heat transfer to the meat portion, patty 16.

Disposed on the meat portion can be a layer 26 of a meat condiment, e.g., a meat sauce, catsup, relish, etc. Preferably, the sauce is of a paste or semi-solid consistency similar to the consistency of peanut butter. This insures that the sauce will stay in place and will not penetrate into the bread layer 18. It is also preferred to seal the bread layer against penetration of the sauce from layer 26. This can be accomplished by a layer 28 of a food having a solid to semi-solid consistency. An example of such a sealing layer is cheese. This cheese can be melted and applied to the open face of bun half 18 or can simply be a slice of cheese that is laid between the sauce 26 and the bread 18.

The remaining bread slice, e.g., the top half 20 of the bun is placed on the opposite surface of the bread layer 18. As illustrated, bread layer 18 is the lower half of a hamburger bun and the top half of the bun is placed against the under surface of bun half 18. Bread layer 20 is in contact with the opposite inside surface of the envelope. As previously mentioned, sides 12 and 14 of the envelope are sealed at their peripheral edges 30 and 32. This sealing can be accomplished by use of a heat sealable plastic foil such as polyethylene. Alternatively, an adhesive such as a hot melt, which is chiefly an ethylene-vinyl acetate copolymer such as Elvax with a minor amount of a tackifying resin such as rosin, can be used.

When the meat layer 16 and sauce condiments 26 are heated to approximately the boiling temperature of water, some steam and hot vapors are generated within the package. These vapors rise, as shown by the broken lines, and heat the bread layers by convection. The hot water vapor also freshens the bread layers so that they become freshly steamed during the heating. Any condensate which is formed will collect on the under or inside surface of plastic layer 12 as shown by droplets 34 and this condensate will run down the inside surface to the periphery of the package and be returned to the meat layer. In this manner, the meat and sauce layers are retained in a moist, fresh condition and are not dehydrated by the heating.

Figure 3:
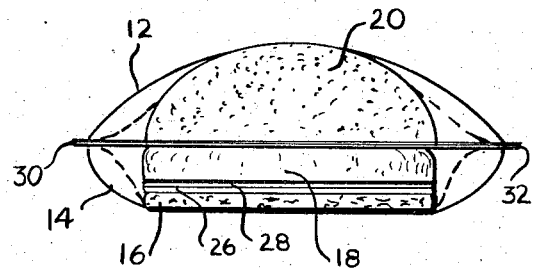
FIG. 3 is another view of a hamburger package.

FIG. 3 illustrates another packaging arrangement which is basically the same as that of FIGS. 1 and 2. The package has plastic foil sides 12 and 14 which are joined at their peripheral margins 30 and 32 to form an envelope. The meat layer 16, sauce layer 26, sealing layer (cheese) 28 and lower bun half 18 are placed in successive order in the envelope. The upper half 20 of the bun, however, is shown inverted with its open face contiguous to the crust surface of bun half 18. This exposes the upper surface of the bun to the purchaser's view and provides a more pleasing package. FIG. 3 illustrates a typical outline of an envelope of a heated package in solid lines while the outline of the envelope of an unheated or frozen package is shown by the broken lines to show the vapor expansion of the package upon heating.

The envelope is sealed about the sandwich and the package interior can be at atmospheric pressure or below. Vacuum packing wherein the pressure is below atmospheric pressure, e.g., from about 0.01 to about 13 pounds per square inch, can be used. Such vacuum packing is preferable since it greatly reduces the heating time for the package. In a typical embodiment, a hamburger sealed at atmospheric pressure requires about 10 to 12 minutes heating time, while one sealed under vacuum requires only about 4 minutes for equal heating of its contents. Conventional vacuum packaging methods, wherein the contents are sealed while hot or in the presence of steam, can be used.

The shape of the envelope can also be varied as desired. A preferred shape is one that conforms closely to the outline of the sandwich, e.g., a bulbous round envelope is preferred for hamburgers. This will minimize the vapor content of the sandwich and greatly improve the freezing and heating of the package.

The invention has been described with reference to the preferred embodiment, i.e., a hamburger. Other sandwiches can, of course, be similarly packaged and the advantages of heating and freshness of the product described herein are similarly obtained. Examples of such sandwiches are: cheeseburger, chili dog, hot dog, hot dog with sauerkraut, corned beef, pastrami, barbecue ham, pork or beef, ham sandwich, cube steak, chip beef, turkey, chicken, sausage, ham and egg, sausage and egg, fried egg, Western, an omelet type with bits of ham, onion and pepper, French dip, fish, etc. Egg portions are of course treated as meat portions herein.

As described herein, the meat portion is pre-cooked which means that all or a portion of the necessary cooking is performed before sale and distribution of the package. Preferably this cooking is performed externally of the package and the partially or completely cooked meat portion is then packaged. Generally, the meat product is browned on all sides and from about 30 to 100 percent of the necessary cooking is performed externally of the package. An example of a partially cooked meat product would be fish which would be surface browned by high temperature frying or broiling before packaging and the remainder of the cooking would be performed by the customer during heating of the sandwich.

As previously mentioned, the sauce employed on the sandwiches should be substantially non-penetrating to the bread. The sauces are, therefore, somewhat thicker or more solid, e.g., have a lesser moisture content, than sauces commonly used on sandwiches. A relatively simple test can be used to evaluate the necessary consistency of the sauce by placing a bread layer on a layer of the sauce at room temperature for about 5 to 10 minutes and then inspecting the bread. If the sauce has only coated the bread layer without being drawn up into the bread by absorption or capillary action, the sauce is of proper consistency.

Figure 4:
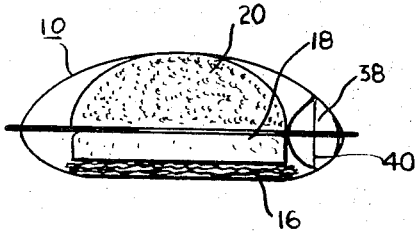
FIG. 4 illustrates a package of another type of sandwich.

Some sandwiches, particularly the French dip sandwich, a thick sauce as described herein is not satisfactory since these sandwiches require that the sauce penetrate the bread layers. With these sandwiches, a package such as that illustrated by FIG. 4 can be used. In this package, the meat layer 16 and bread layers 18 and 20 are disposed as described with regard to the other sandwiches and the meat sauce, a meat gravy or cooked meat juices 38 is placed in a separate foil envelope 40. This envelope can be contained within package 10 and upon removal of the sandwich, envelope 40 can be withdrawn, opened its contents poured onto the bread layers.

While the invention has been described with reference to the preferred mode of reheating of the package by use of heated water, other methods can be used and the arrangement of the layers of the sandwich is equally advantageous for rapid heating of the package. Thus, the sandwich package can be placed in a conventional oven for heating by thermal convection or can be placed in a microwave oven. In such heating techniques, the sandwich package should be placed with the meat portion exposed to the heating waves.

The resulting sandwich, regardless of the particular heating technique used, will be superior, even to freshly prepared sandwiches. Because of the internal steaming in the package, all components of the sandwich are heated and the sandwich can be served at a temperature greater than commonly experienced with freshly prepared sandwiches. This result is apparently caused by the use of cold sauces and condiments and the use of bread layers which are either not steamed or are steamed to a lesser degree than is achieved with the sandwich package of the invention. The bread portions of the sandwich are always withdrawn from the heated package in a condition similar to freshly baked bread products.

The invention has been described with rgeard to the illustrated preferred mode of practice. It is not intended that the invention be unduly limited by this illustration. Instead, it is intended that the invention be defined by the elements, and their obvious equivalents, set forth in the following claims.

We claim:

1. A package containing a frozen comestible that comprises:
an envelope of a plastic foil which is thermally stable at a temperature of at least about 250° F.;

a pre-cooked meat product with one of its major sides in direct contact with one wall of said envelope;

a sauce on the opposite side of the meat product and having a semi-solid paste consistency sufficient to be substantially non-penetrating to bread layers placed in contact therewith for a period of from 5 to about 10 minutes at room temperature;

a first bread layer on said sauce layer;

a second bread layer on said first bread layer with its opposite side in contact with the opposite inside wall of said envelope;

said envelope being sealed about its peripheral margins to provide a vapor and moisture resistant barrier about said comestible.

2. The package of claim 1 wherein said meat product is a pre-cooked and sliced meat product.

3. The package of claim 1 wherein said package is sealed at a pressure of from 0.01 to about 13 pounds per square inch absolute pressure.

4. The package of claim 1 wherein said meat product is a hamburger and said bread layers are split halves of a bun.

5. The package of claim 4 wherein a layer of cheese separates said sauce layer and said first bread layer.

6. The package of claim 4 wherein the open face of the second half of said bun is contiguous to the crust surface of said first half of said bun.

7. The package of claim 4 wherein said envelope is countoured about said sandwich.

References Cited

UNITED STATES PATENTS

| Number | Date | Name | Class |
|---|---|---|---|
| 2,990,096 | 6/1961 | Crosby | 99—196 UX |
| 3,132,029 | 5/1964 | Beck | 99—171 H |
| 3,607,312 | 9/1971 | Ready | 99—171 CP X |
| 2,424,536 | 7/1947 | Mayer et al. | 99—187 X |
| 2,864,932 | 12/1958 | Forrer | 99—171 HX |
| 3,031,309 | 4/1962 | Bogner et al. | 99—171 H |
| 3,539,354 | 11/1970 | Colvin | 99—171 H |
| 1,830,246 | 11/1931 | Sanford | 99—171 R |
| 2,834,677 | 5/1958 | Geisler | 99—196 UX |
| 3,719,138 | 3/1973 | Blaetz et al. | 99—192 BBX |

FRANK W. LUTTER, Primary Examiner

S. L. WEINSTEIN, Assistant Examiner

U.S. Cl. X.R.

426—124, 128, 129